April 18, 1961

A. L. REDIGER 2,980,157

APPARATUS AND METHOD FOR FORMING WINDING
END TURNS OF A DYNAMOELECTRIC MACHINE

Filed July 20, 1959

Inventor:
Alvin L. Rediger,
by H. F. Manbeck, Jr.
Attorney.

April 18, 1961

A. L. REDIGER

2,980,157

APPARATUS AND METHOD FOR FORMING WINDING
END TURNS OF A DYNAMOELECTRIC MACHINE

Filed July 20, 1959

Inventor:
Alvin L. Rediger,
by H. F. Manbeck, Jr.
Attorney.

United States Patent Office 2,980,157
Patented Apr. 18, 1961

2,980,157
APPARATUS AND METHOD FOR FORMING WINDING END TURNS OF A DYNAMOELECTRIC MACHINE

Alvin L. Rediger, Holland, Mich., assignor to General Electric Company, a corporation of New York Filed July 20, 1959, Ser. No. 828,343
14 Claims. (Cl. 153—54)

This invention relates generally to dynamoelectric machines and more particularly to an improved apparatus and method for forming and shaping winding end turns of electric motor stators.

In the conventional dynamoelectric machine construction and especially in small or fractional horsepower induction electric motors, the stator core member is provided with a rotor receiving bore and winding slots extending radially outward from the bore. A predetermined number of coils of copper wire, coated with insulation such as enamel, which form excitation windings, are arranged within the slots and have end turns located outside the slots, axially beyond the sides of the stator core member. This construction introduces certain considerations and problems in mass production motor manufacture, for it is highly desirable and important that the winding end turns be secured into a relatively stationary and compact bundle away from the stator bore. for instance, the end turns must be maintained away from the bore so that they will not interfere with the relative rotation between the stator core and rotor during motor operation. Moreover, it is necessary to prevent damage to the winding end turns from vibration or short circuits caused by movement of the individual wires against each other tending to rub off the insulation and baring the wires. These considerations must be taken into account and provided for during successful motor manufacture.

In addition, motors which have the aforementioned structure are employed in a wide variety of applications, introducing other factors which add to the complexity and overall cost of producing motors. For example, the motors may be utilized in situations where available space for winding end turns is at a premium, such as in hermetically sealed refrigerator compressors. In other instances, it has become customary to use stator members of standard dimensions and design as replacement units in already available housings which have predetermined internal clearances for the stator members and winding end turns. However, due to continuing changes in motor performance requirements, the standard stator cores must be wound with an increased amount of copper; i.e., increased wire size and/or number of windings, in an effort to obtain the desired performance with use of the standard stator cores. This increase in copper results in a corresponding increase in winding end turn volume. Thus, since the replacement stator units must fit within the space designed for stator units having the smaller winding end turn volumes, the available housing space for the winding end turns is a limiting factor on the ultimate motor performance which can be obtained. It is essential, therefore, that the manufacturing procedures produce a stator member having the winding end turns tightly compressed into a compact mass of minimum volume.

Furthermore, in the various motor applications there is a wide variance in the winding end turn shape requirements. For example, in the "pancake" type of motor, the winding end turn contour must be extremely flat and must fit tightly against the stator core end face.

Heretofore, the practices for manufacturing in mass production stator core units having winding end turns of the desired securement, compactness, and shape have not been entirely satisfactory for one reason or another. For example, typical of the approaches followed is the one in which the winding end turns are initially tied or laced into a bundle and thereafter compressed by apparatus using a plurality of cam actuated jaws. These jaws are moved radially against the winding end turn outer, inner, and top surfaces simultaneously by pressure, such as hydraulic means.

The disadvantages and inherent limitations of prior practices are readily apparent. For instance, the cam actuated jaws are inherently restricted as to the type of winding end turn configurations which they are capable of producing. Moreover, there is no assurance that the compressed end turns will be continually of a uniformly high quality; i.e., in many instances, the jaws damage the end turns by nicking or chipping off the enamel insulating coating or by cutting the wire which ultimately results in electrical short circuits and premature motor failure. In addition, it has been found that, as the volume of the end turns is increased, there is a corresponding increase in the force required to compress the end turns, with the result that the apparatus for actuating the radially movable jaws is necessarily large and expensive. Further, prior procedures have been limited as to the size or volume of the end turns that can be satisfactorily compressed and formed, for a point is finally reached where any additional pressure of the jaws against the end turns will cause injury to the wires; e.g. cutting of the wires.

Thus, it is readily apparent from the foregoing that the provision of an inexpensive yet satisfactory and versatile method and apparatus for manufacturing in mass production quantities stator core members having suitably formed and shaped winding end turns, is a continuing problem in the motor industry.

Accordingly, it is a primary object of the present invention to provide an improved method for forming and shaping winding end turns which are closely controlled in size, shape and compactness, and which are of uniformly high quality.

It is another object of the invention to provide an improved method for forming and shaping winding end turns in mass production quantities into a far more dense mass than has been heretofore obtainable by prior practices and which will produce winding end turns and stator core units of improved quality.

Still another object is the provision of a process of manufacture which is adaptable to form winding end turns into a variety of shapes and sizes at a unit cost considerably lower than has been accomplished heretofore.

It is yet another object of the present invention to provide an apparatus which is capable of closely controlling the formation of winding end turns as to size, shape and compactness, and which produces winding end turns of uniformly high quality.

It is still another object of the invention to provide an apparatus which is capable of forming and shaping winding end turns in mass production quantities and which is versatile in nature and capable of forming the end turns into a variety of shapes and sizes at a unit cost lower than has been accomplished heretofore.

In carrying out the objects of this invention in one form thereof, I provide an improved method by which the winding end turn assemblies of a stator core member may be accurately and properly formed and shaped. In this method, I initially position an end turn assembly between two relatively rotatable shaping surfaces. The end turn assembly is then compressed between the surfaces while concurrently there is produced a rolling pressure engagement between the end turn assembly and at least one of the shaping surfaces whereby the wires of the end turn assembly are caused to flow in front of the rolling engagement to form a compact mass having peripheral surfaces essentially conforming to the contour defined by the shaping surfaces. After the forming and shaping operation has been completed, the formed end turn assembly is removed from between the shaping surfaces.

By a further aspect of my invention, I provide an improved apparatus particularly adapted for carrying out the above method. In the preferred embodiment, this apparatus includes a holding and forming unit having a rotatably mounted end turn receiving and forming chamber defining an outer end turn shaping surface. Means are provided for holding the end turn assembly within the chamber for rotation therewith. A shaping assembly is disposed within the chamber and spaced from the outer shaping surface. The assembly is formed with a rotatable inner end turn shaping surface which is movable between a retracted position and an extended position, located a predetermined radial distance from the outer shaping surface such that the shaping surfaces engage the end turn assembly when the inner surface is in its extended position. The chamber is rotatably driven while the inner shaping surface is in its extended position producing a rolling engagement between the inner shaping surface and the end turn assembly to form the end turn assembly into a formed compact mass having peripheral surfaces conforming to the contour of the cooperating shaping surfaces.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings:

Figure 1:
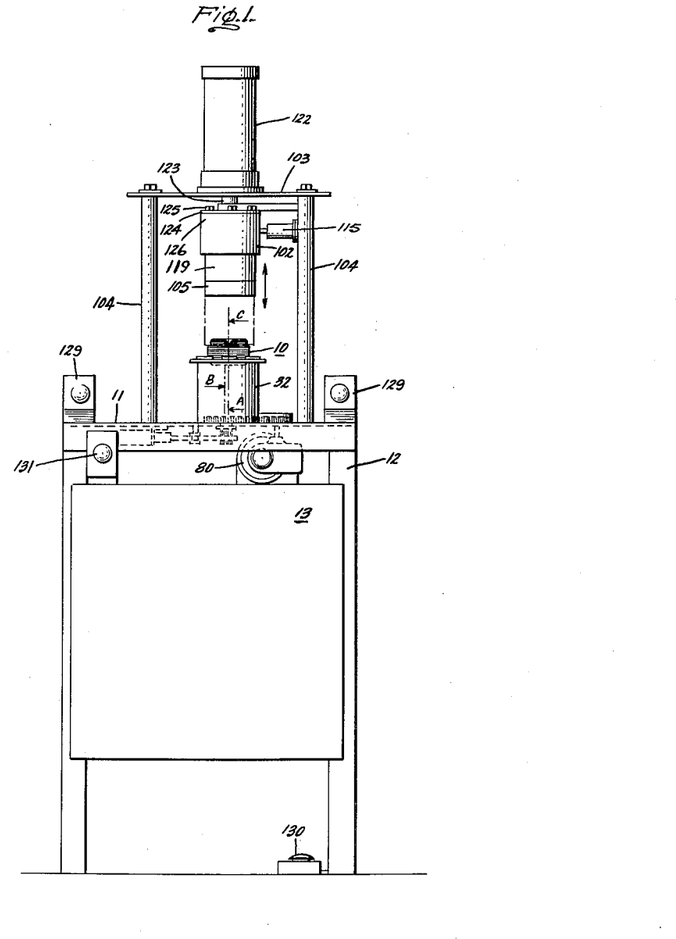
Fig. 1 is a front elevational view of the improved winding end turn forming apparatus constructed in accordance with my invention.

Referring now to the drawings in more detail, Fig. 1 illustrates the general construction of the complete apparatus for forming and shaping the winding end turns of an electric motor stator core member 10 (the member to be described in detail hereinafter). A horizontal stationary platform 11 is mounted, by any suitable means (not shown) onto a rectangular base frame structure, generally indicated at 12. This structure forms a supporting frame 13 for carrying my improved apparatus.

Figure 2:
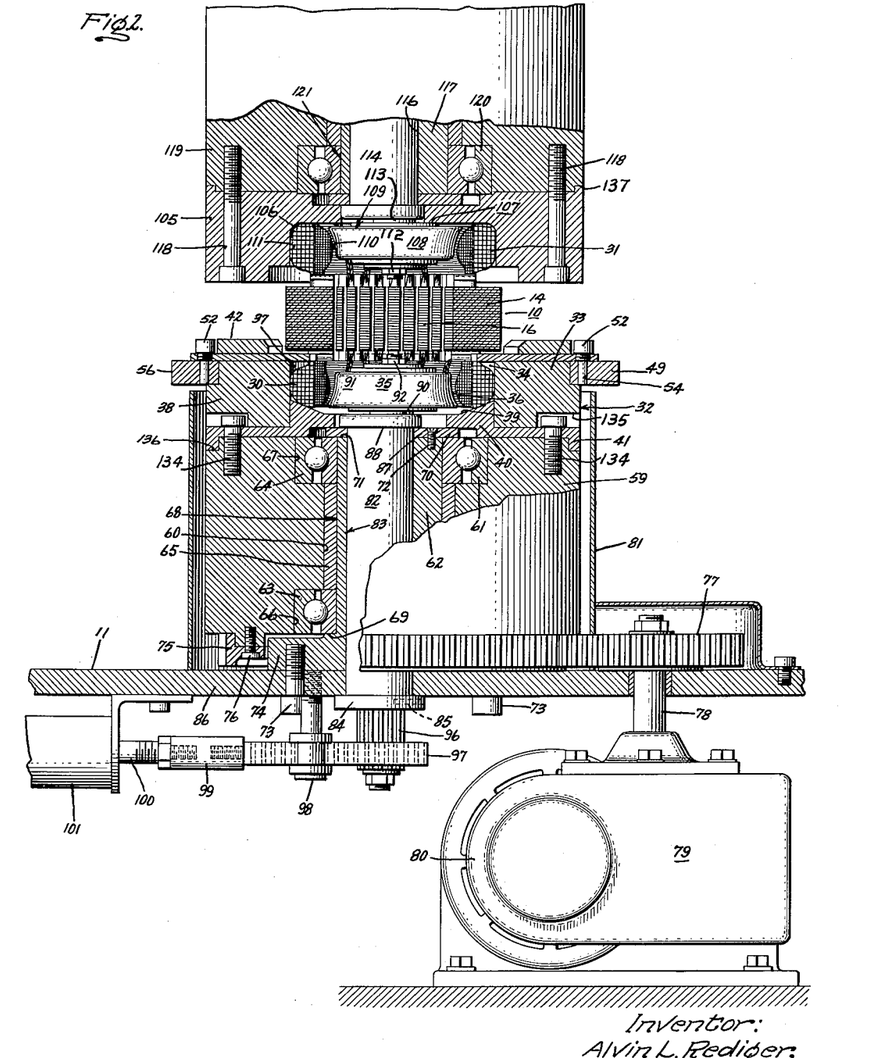
Fig. 2 is an enlarged view, being partially broken away and partially in section, of a portion of the apparatus shown in Fig. 1 with a stator core member locked thereon to illustrate in more detail the winding end turn forming units of the present invention.

As shown most clearly in Fig. 2, the preferred embodiment of my apparatus has means to form simultaneously the winding end turns on both sides of the stator core member 10. By way of example only, stator core member 10 is illustrated as being of the type commonly employed in alternating current induction motors of the fractional horsepower frame size. Briefly described (see Fig. 5 in particular), stator core member 10 is conventionally formed with a laminated magnetic core 14 having a main or yoke portion 15 with teeth 16 extending radially inwardly therefrom to form a plurality of coil winding slots 17 and a rotor receiving bore 18. Each slot 17 is provided with an insulating liner 19 of standard configuration. A main or running winding 20, wound with a plurality of turns of enameled wire, has coil sides arranged within the bottom of the slots away from bore 18, and has end turns 21 and 22 extending axially beyond the respective stator core side faces 23 and 24. A start winding 25 is arranged beneath the main winding 20 and has coil sides distributed within the slots, and end turns 26 and 27 respectively positioned adjacent main winding end turns 21 and 22. The windings 20 and 25 are electrically insulated one from the other by electrical insulating means 28, such as a plurality of sheet like members, interposed between the respective winding sides and end turns. A cord 29 is wrapped around the main and start winding end turns and a portion of the insulating means disposed therebetween on each side of the stator core member 10, thus respectively forming winding end turn assemblies 30 and 31.

In the preferred form of my improved apparatus, as clearly illustrated in Fig. 2, a lower (as viewed in the drawings) stator core holding and end turn forming unit, denoted generally by reference numeral 32, is provided with a die 33 having a winding end turn receiving and forming chamber 34 for shaping the outer peripheral surface of winding assembly 30, and a shaping mechanism, generally indicated at 35, having a wall defining a shaping surface 36 for forming the inner peripheral surface of end turn assembly 30, movably mounted within chamber 34 in a manner to be described hereinafter. Preferably, the end turn shaping surface of chamber 34 is defined by an annular inner wall 37 of a forming drum 38 and by upper wall or surface 39 of a raised portion 40, which is integrally formed on a substantially annular member 41. As shown, portion 40 fits telescopically within the lower portion of the drum 38. Thus, the illustrated die 33, with its end turn receiving and forming chamber 34, is composed of two complementary parts, forming drum 38 and annular member 41. Chamber 34 and surface 36 cooperate to form and shape winding end turn assembly 30 in a way which will become more apparent as the description proceeds.

Figure 3:
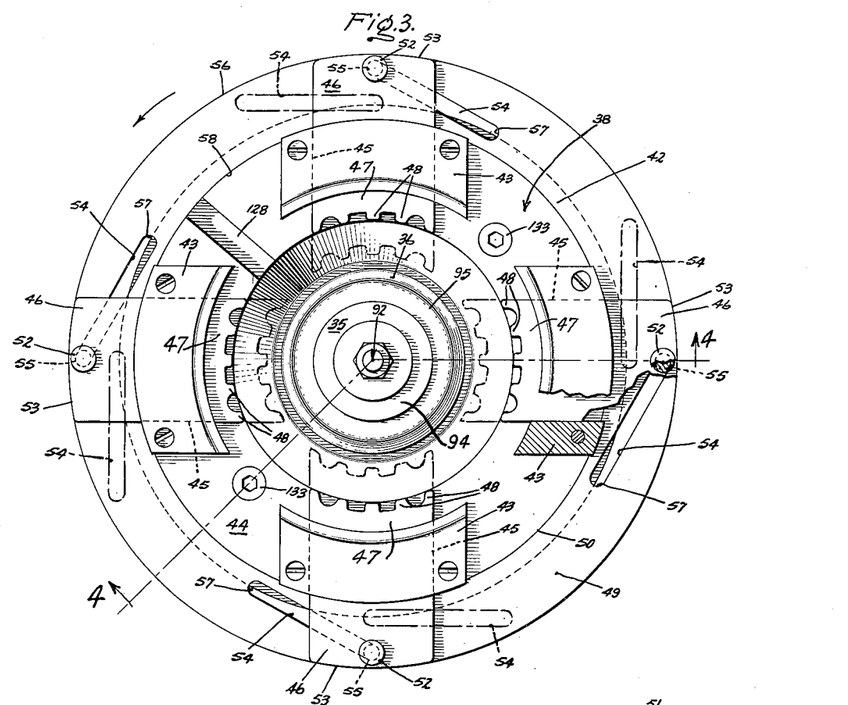
Fig. 3 is a plan view of the lower stator core holding and end turn forming unit of Fig. 2, showing the lower unit without a stator core member being positioned thereon.
Figure 4:
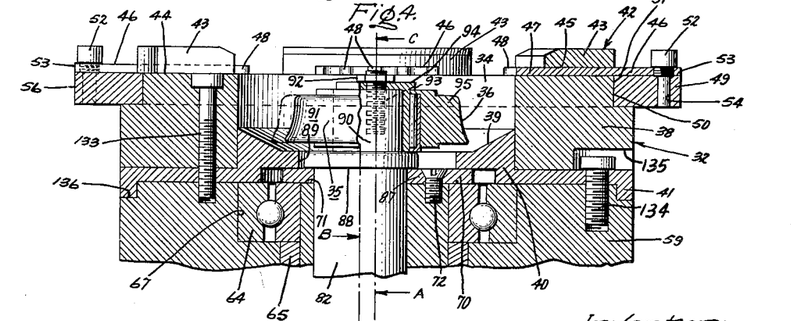
Fig. 4 is a sectional view of the machine of Fig. 3 along the line 4—4.

Unit 32 has a stator core member holding or retaining structure, indicated at 42, carried by drum 38. As illustrated in Figs. 3 and 4, structure 42 comprises four identical elements 43 fixedly secured, 90 degrees apart, on upper external surface 44 of drum 38. Each element 43 is provided with a radially extending channel 45 forming a guideway which slidably engages a locking member 46 having an inner end portion 47 adapted to move between the stator core side face 23 and winding end turn assembly 30. A plurality of inwardly extending projections 48, integrally formed on inner end portion 47, are so arranged that they will fit between a predetermined number of winding sides at points adjacent to, but axially beyond, the stator core winding slots 17 to retain the stator core member 10 firmly in unit 32 during the formation and shaping of the winding end turn assembly. The means for moving the individual end portions 47 of member 46 into and out of engagement with the stator core member 10 is shown in the preferred form as being a manually operated ring 49 which is slidably received in a complementary shaped annular recess 50 provided in the upper peripheral surface 51 of drum 38. Each locking member 46 is movably connected to ring 49, as by a guide stud 52 projecting downwardly from outer end portion 53 of locking member 46 into an elongated guide slot 54 provided in ring 49. Each guide slot 54 is constructed such that one end, 55, is disposed adjacent outer peripheral ring surface 56, while the other end 57 is positioned adjacent the inner peripheral ring surface 58, the ends being angularly displaced one from the other with respect to the center of the ring 49. This arrangement, as can be seen in Fig. 3, provides a camming action in which counterclockwise movement of ring 49 (in the direction of the arrow) will simultaneously force the four locking members 46 to move from an open or retracted position, radially inward to a closed or locking position (indicated by the broken lines). Clockwise rotation of ring 49 will corollarially restore the locking member 46 to their retracted position.

Referring now to Fig. 2, it can be seen that die 33 with its stator core retaining structure 42, is removably secured (in a manner to be explained hereinafter) on a cylindrical head 59 which has a concentrically disposed inner bore 60 extending the length of head 59. Head 59 is, in turn, rotatably supported by any suitable means 61 on a sleeve shaft 62 extending through bore 60. It should be noted at this point that both the cylindrical head 59 and die chamber 34 are therefore rotatable around the same vertical axis "A" (see Fig. 4). The means 61 is illustrated as comprising a pair of ball bearings 63 and 64 in spaced relation, with a bushing 65 being provided therebetween. The outer races of the bearings are mounted within suitably disposed accommodating annular recesses 66 and 67, cut into the cylindrical head 59 at bore 62. The inner races of the bearing are mounted on outer surface 68 of sleeve shaft 62, and are held against axial movement by shoulder 69 on shaft 62 and plate 70 secured to the upper end surface 71 of shaft 62 by screw means 72. Sleeve shaft 62 is fixedly fastened in a stationary upright position on supporting frame 13 by a plurality of bolts 73 projecting through stationary platform 11 into a flange 74, which is integrally formed on the base of shaft 62 and radially extends below and spaced from cylinder head 59.

The cylindrical head 59 and consequently, die 33 and the stator core retaining structure 42 which are carried thereon, may be rotatably driven in any suitable manner, such as by the following arrangement. A spur gear 75, having an internal flange 74, is mounted as by complementary fitting parts and screw means generally indicated at 76, on the bottom surface of head 59, coaxially therewith and radially beyond flange 74. Gear 75 meshes with a parallel axis spur gear 77, which is driven through a shaft 78 connected to a speed reducing gear box 79 which, in turn, is driven by an electric motor 80. Gears 75 and 77, as well as cylindrical head 59 and associated parts, may be enclosed within a protective housing 81 for reasons of safety.

Referring now to the shaping mechanism 35 mentioned heretofore as having a shaping surface 36 movably mounted in die chamber 34, an inspection of Figs. 2 and 4 clearly reveal the construction and operation of the mechanism. In the preferred embodiment, mechanism 35 comprises a shaft 82 being movably carried in a longitudinal bore 83 eccentrically provided in sleeve shaft 62 and having a greater axial length than sleeve shaft 62. At its lower end portion (see Fig. 2), shaft 82 projects through platform 11 and has a collar 84 pinned thereto as at 85 in abutting relation with the underside 86 of platform 11. The upper portion of shaft 82 extends through aperture 87 of plate 70 and has an integrally formed radially projecting shoulder 88 received within central hole 89 of annular member 41 in abutting relation with plate 70. With this construction, it will be seen that shaft 82 is held against axial movement by collar 84 and shoulder 88, while it is free to turn in sleeve shaft bore 83 around axis B which is parallel to but offset from the axis of rotation "A" (shown in Fig. 4) of die chamber 34 and head 59.

An annular stud 90 is eccentrically provided on the upper end of shaft 82, adjacent shoulder 88, and extends upwardly into die chamber 34. Concentrically mounted on stud 90 within chamber 34 is a shaping assembly 91 which is retained thereon by screw means 92 having a threaded portion 93 axially received in stud 90. Assembly 91, shown in detail in Fig. 4, comprises an inner hub 94, secured to stud 90 as described above, and an annular roller portion 95 having a curved external face of the desired contour which defines surface 36 (heretofore mentioned) for shaping the inner peripheral surface of the winding end turn assembly.

It will be observed, that with this arrangement, roller portion 95 with its shaping surface 36 is free to revolve around axis "C", the eccentric axis of stud 90. In addition, it will be seen that stud 90, and shaping assembly 91 carried thereon, will have a retracted or unoperated position in which the eccentric axis "C" of the stud is approximately in axial alignment with the axis of rotation "A" of the die chamber 34. Thus, assembly 91, in its retracted position, will be located centrally in chamber 34.

Referring once again to Fig. 2, there is illustrated a suitable actuating means for angularly moving or pivoting shaping assembly 91 from its retracted position to an operated or extended position in which shaping surface 36 is located a predetermined radial distance from the shaping surface of chamber 34 (the extended position being represented by the broken lines in Fig. 4). As illustrated, shaft 82 which is operatively connected to shaping assembly 91, carries a pinion 96 beneath platform 11 in engaging relation with a longitudinally extending reciprocating rack 97, supported along the underside of the platform by collar guide 98. A coupling means 99 attaches rack 97 to a rod 100 operated by an air cylinder 101.

Considering now the operation of the means for changing the relative position of shaping assembly 91 within chamber 34, it will be seen from Figs. 2–4 inclusive that actuation of the air cylinder 101 causes rack 97 to move to the right (as viewed in Fig. 2), imparting a partial movement to pinion 96 and hence, to shaft 82. Due to the eccentric construction of the sleeve shaft bore 83 and of stud 90 on shaft 82, as set for above, partial rotational movement of shaft 82 pivots stud 90, and consequently assembly 91 mounted thereon, from the retracted position to the extended position in which eccentric axis C is offset in parallel relation to axis of rotation A for die chamber 34. Thus, in the operated position, shaping surface 36 of assembly 91 will be provided near but spaced from inner wall 37 of chamber 34 (the left side as viewed in Figs. 3 and 4) by a predetermined amount which corresponds in dimension to the thickness of the winding end turn assembly in its finished compacted form. It will be apparent to those skilled in the art that the cumulative effect of the combined eccentricity of sleeve shaft bore 83 and stud 90 of shaft 82 will determine the pivotal effect and proximity of shaping surface 36 with respect to inner wall 37 of chamber 34 in the operated position for any given diameter of surface 36. Further, angular movement of assembly 91 is wholly independent of any rotational movement which may be imparted to die chamber 34, as previously described. The precise manner in which chamber 34 and shaping assembly 91 cooperate to produce a formed and shaped winding end turn assembly will be discussed more in detail hereinafter.

An upper end turn forming unit, generally indicated by numeral 102 in Fig. 1, is supported above and axially aligned with respect to the lower unit 32 in any suitable manner, such as by a bridge construction 103 mounted on platform 11 of frame 13 by a plurality of spaced apart vertical pillars 104. Upper unit 102 (see Fig. 2) performs the same winding end turn forming and shaping function as the lower unit 32 and in the preferred embodiment may be provided with corresponding end turn forming elements to those heretofore described for lower unit 32. As illustrated, upper unit 102 is provided with an upper forming die 105 constructed in a single piece, having a winding end turn receiving and forming chamber 106 for shaping the outer surface of winding end turn assembly 31, and a shaping mechanism indicated by 107, having an assembly 108 identical in construction to that of assembly 91 of the lower unit 32. Thus, assembly 108 has a roller portion 109 with an external shaping surface 110 movably mounted within the die chamber 106. As in the case of the lower unit 32, inner wall 111 of the die chamber 106 and shaping surface 110 cooperate to form and shape the winding end turn assembly 31 of stator core member 10 (the manner to be set forth in detail hereinafter).

The angular movement of assembly 108, from a retracted to an extended position within the upper die chamber 106, may be accomplished in the same fashion as that set forth above for assembly 91. Briefly described, assembly 108 is removably secured, as by screw means 112, onto stud 113 which is eccentrically arranged on the lower end of a vertical shaft 114 operatively connected by any suitable means (not shown) to an air cylinder 115. Shaft 114 is carried in an eccentric bore 116 provided in a nonrotatable sleeve shaft 117. The upper forming die 105 is freely and rotatably carried on the sleeve shaft, as by removably securing it by bolts 118 to an end face of a cylindrical head 119 which in turn is journaled, as by bearing means 120, to the outer surface 121 of sleeve shaft 117. Actuation of the air cylinder 115 will therefore pivot assembly 108 from a retracted position, centrally of chamber 106, to an operated or extended position in which shaping surface 110 will be disposed a predetermined distance from inner wall 111 (see Fig. 7).

Figure 7:
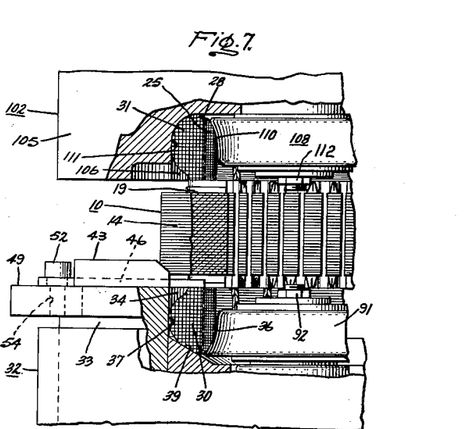
Fig. 7 is a similar view to Fig. 6 showing both winding end turn assemblies being formed simultaneously in accordance with one aspect of my invention.

In the preferred embodiment, it will be seen from an inspection of Fig. 7 that the extended position of shaping assembly 108 is directly above and in axial alignment with the extended position of shaping assembly 91. It has been found that with the shaping surfaces in axial alingment during the formation of the end turn assemblies (to be described hereinafter), the winding sides within the stator core winding slots 17 have little tendency to move within the slots 17, thereby facilitating the formation and shaping of the winding end turn assemblies.

Upper unit 102 may be raised and lowered relative to lower unit 32 by any suitable means. The means illustrated in Fig. 1 comprises a hydraulic cylinder 122 secured on the top portion of bridge 103 and centered with respect to axis of rotation A of lower die chamber 34. The hydraulic cylinder 122 houses a piston (not shown) which drives a piston rod 123 in the usual way, the lower end of which is threaded into a cap plate 124 fixedly mounted by bolts 125 to the upper end of a drum 126. The upper end of sleeve 117 is secured to the drum by any suitable means (not shown). Thus, the lineal movement of upper unit 102 does not affect the angular movement of assembly 108 contained within die chamber 106 or the rotational freedom of forming die 105.

In carrying out the improved method of the present invention, the various components of my apparatus assume initial positions as illustarted in Figs. 1, 3, and 4. The upper forming unit 102 is raised (Fig. 1) above the loyer unit 32 and the assemblies 91 and 108 are in their retracted positions, centrally located within their respective die chambers 34 and 106. Further, the locking members 46 of the core retaining structure 42 are fully retracted as displayed by Figs. 3 and 4.

Figure 5:
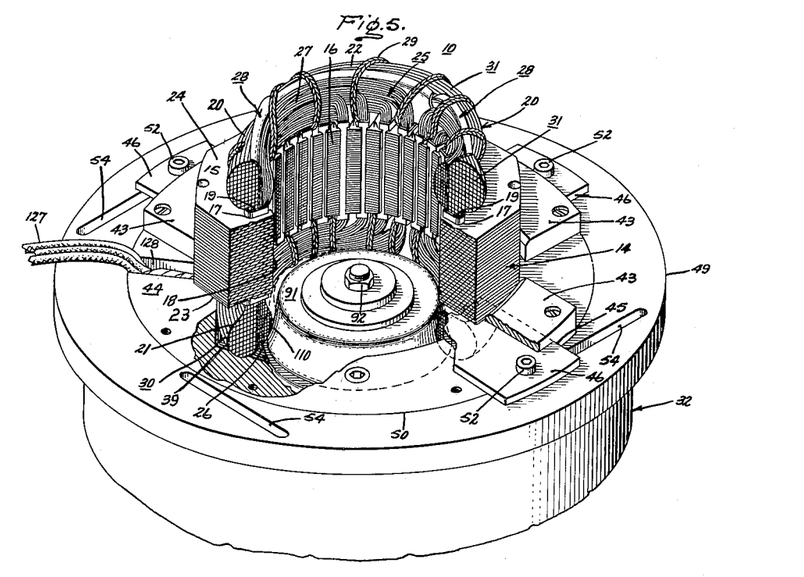
Fig. 5 is a perspective view, broken away in part, of the stator core lower holding and forming unit of Fig. 3 and stator core member locked thereon to illustrate detail.
Figure 6:
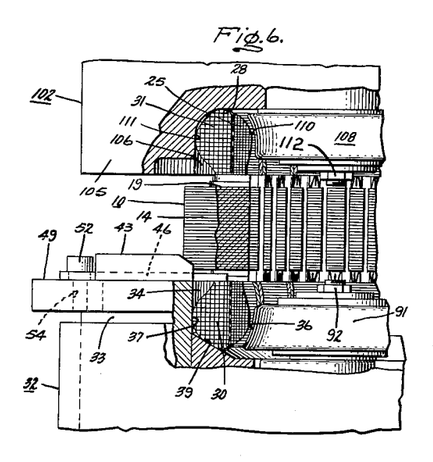
Fig. 6 is an enlarged view, being partially broken away and partially in section, of a portion of the improved apparatus showing a part of the upper and lower units with the stator core member held therebetween being rotated just prior to the formation of the end turn assemblies.

Stator core member 10, with its winding end turn assemblies 30 and 31 to be formed, is placed on the lower unit 32 by the machine operator such that end turn assembly 30 is accommodated within die chamber 34 between inner wall 37 and shaping surface 36 of assembly 91. Since assembly 91 is located centrally within chamber 34, there is adequate circumferential space for receiving the uncompressed end turn assembly 30, which in its unformed state has its component parts arranged in a relatively loose mass producing a comparatively voluminous assembly. Ring 49 of the core retaining structure 42 may then be rotated counterclockwise (Fig. 3), moving locking members 46 radially inward to a closed position, firmly holding stator core member 10 in unit 32 (in the manner described above) for the subsequent operations. Figs. 1 and 5 clearly reveal the stator core member 10 locked on lower unit 32, preparatory to the forming operation. Although the placing and locking procedures set forth above have been mentioned as being accomplished manually, it should be apparent that they could be as easily performed automatically in any manner well known in the art without actually departing from the present invention.

If desired, winding energizing external leads 127 (Fig. 5) may be attached to the stator core member 10 prior to its assembly onto lower unit 32, in which case, stator core member 10 must be arranged on unit 32 with the external leads 127 disposed in a groove 128 suitably provided on the upper external surface 44 of drum 38, extending radially outward from the die chamber 34.

After the stator core member has been properly seated and locked onto lower unit 32, the machine operator initiates operation of the apparatus by applying momentary pressure on switch assembly 129 (Fig. 1), which energizes the hydraulic cylinder in the usual manner to drive rod 123 downwardly. This lowers upper unit 102 a predetermined distance until as illustrated by Fig. 2, winding end turn asembly 31 is accommodated in die chamber 106 and the end turn assemblies are pressed against the bottom wall portions of their respective chambers. It will be observed that with the upper unit 102 in its descended position, upper forming die 105, which is normally capable of free rotation, will be locked together with the stator core member 10 and the lower die 33, the three pieces being rotatable as a single unit.

The rotation of the dies 33, 105 and stator core member 10 is initiated by the application of momentary pressure by the machine operator's foot onto starting switch assembly 130 shown in Fig. 1. The depression of switch assembly 130 may energize and control electric motor 80 by any one of the several well-known ways (not shown). The energized motor drives die 33 (and consequently the other locked together pieces) through the gear reduction box 79, shaft 78, gear 77, and gear 75, which is secured to the bottom of cylindrical head 59, causing the ultimate rotation of head 59 and the attached die 33. In actual practice, a speed of rotation for the locked together pieces in the range of 80 r.p.m. has proven to be very satisfactory.

The forming and shaping operation may be started by pressing switch assembly 131 which, by any standard and well-known means (not shown), causes the simultaneous operation of air cylinders 101 and 116. Since both end turn assemblies 30 and 31 are formed and shaped in the same manner, for reasons of brevity and simplicity, only the formation of end turn assembly 30 will be described in detail.

Actuation of air cylinder 101 causes the partial rotation of shaft 82, through the rack and pinion arrangement previously described. Shaft 82, in turn, pivots stud 90 and assembly 91 from the retracted position toward the operated position shown by Fig. 7. As the shaping surface 36, which is provided by the external surface of the freely rotatable roller portion 95 of assembly 91, is brought into contact with the inner peripheral surface of winding end turn assembly 30, the roller portion 95 will, in effect, be rotatably driven by the revolving die 33 and winding end turn assembly 30. Continued angular or pivotal movement of assembly 91 to the operated position will cause a rolling type pressure engagement between shaping surface 36 and the winding end turn assembly 30, compressing the end turn assembly 30 between inner wall 37 and surface 39 of die 33 and the shaping surface of assembly 91. The proximity of surface 36 in its extended position to the inner wall of the die chamber 33 will determine, of course, the compactness of a winding end turn assembly of a given size. Due to the rolling pressure engagement, the wires of the end turn assembly have a tendency to flow in front of the rolling contact and to pack the voids of the assembly. In this way, there is achieved the compression of the end turn assembly into a dense, compact, unitary mass with the possibility of wire damage attributed to the forming apparatus kept at an absolute minimum. In addition, the peripheral surfaces of the end turn assembly are shaped into a configuration which essentially conforms to the contour defined by the die chamber and shaping surface 36. The end turn assembly is also formed with its inner peripheral surface pressed away from and radially beyond stator core bore 18 to reduce possible interference of the formed end turn assembly with the rotation of a rotor member during later operation of the completely assembled motor (not shown).

When the above forming and shaping step has been completed for both winding end turn assemblies, the air cylinders 101 and 115 may be automatically deenergized by any suitable means (not shown) and the assemblies 91 and 108 will be pivoted away from contact with the revolving winding end turn assemblies and return to their retracted positions, centrally of their respective die chambers 34 and 106. Since the shaping surfaces of assemblies 91 and 108 are no longer in contact with the end turn assemblies, the roller portions of the assemblies will come to rest after a short period of time.

Thereafter, motor 80 may be deenergized or a clutching action may take place in gear reduction box 79 in any well-known fashion (not shown) and the rotation of the locked together members will be stopped. If desired, of course, the cessation of the rotational motion of the locked together pieces may be accomplished before or during the pivotal step recited above.

Upon completion of all the foregoing operations, the hydraulic cylinder may be automatically actuated by any suitable control means (not shown) to raise piston rod 123 and the parts it supports. Consequently, upper unit 102 is lifted away from the stator core member 10 and the stator core member 10 with its formed and shaped winding end turn assemblies 30 and 31 may be removed from the lower unit 32 by turning ring 49 in a clockwise direction (Fig. 3) to return the locking members 46 to their open position. The stator core member can then be easily lifted out of the retaining structure 42. Thus, it will be seen that the machine elements, upper unit 102, lower unit 32, with stator core retaining structure 42, assemblies 91 and 108 will all be ready to start forming the next stator core winding end turn assemblies.

If it is deemed advantageous and desirable to form and shape the external or peripheral end turn assembly surfaces into a contour other than the one illustrated, the upper and lower dies 105 and 33, and the respective assemblies 108 and 91 mounted within the dies, may be conveniently removed and replaced with members having forming surfaces of the desired configuration. For example, the bottom die 33 may be dismantled (refer to Figs. 2–4) by removing the retaining means, which as shown comprises a pair of diametrically spaced bolts 133 extending axially through drum 38 and annular member 41 into head 59, and bolts 134 also projecting through member 41 into head 59. Drum 38 is formed with an annular recess 135 to accommodate the head portions of bolts 134. Assembly 91 may then be removed after screw means 92 have been unfastened, and another assembly and die with the requisite forming surfaces may be mounted onto lower unit 32. Accurate fastening of the dies to the respective cylinder heads 119 and 59 may be aided by the incorporation of a rabbet construction, generally indicated at 136 and 137 (Fig. 2). Although lower die 33 has been shown as comprising two component parts, drum 38 and annular member 41, it should be realized, of course, that die 3 may be formed of a single piece, such as shown for upper die 105, in which event the retaining or mounting means may, for purposes of illustration only, take the form of bolts 133.

In practicing my invention, it will occur to those skilled in the art that the improved apparatus may be modified within the true scope and spirit of the present invention. For example, the formation of the end turn assemblies may be achieved with the axis of rotation of the various parts being horizontal rather than vertical. Further, the upper and lower dies may be driven in synchronism from separate power sources.

It will be recognized from the foregoing disclosure that an important aspect of the improved method of forming and shaping the winding end turn assemblies in the present invention is the rolling pressure engagement provided between at least one of the shaping surfaces and a portion of the peripheral surface of the end turn assembly. Thus, the rolling action might equally as well be applied to the outer peripheral surface of the end turn assembly or the end turn assembly could be moved between two roller assemblies pivotally mounted for relative movement toward each other to produce the highly advantageous rolling pressure engagement. In another possible variation, the rolling pressure action could be produced by holding the end turn assembly and an outer shaping surface stationary while, for example, driving a rotatable roller assembly around and biasing it against the inner peripheral surface of the end turn assembly.

It will be readily manifest from the foregoing that the advantages of the present invention are numerous. My improved method and apparatus heretofore described provide for the accurate and close control of the size, shape and compactness of the individual winding end turns. The resultant stator core unit has winding end turns which are permanently secured away from the stator bore and which have the individual wires maintained relatively stationary with respect to each other, thereby minimizing the dangers of possible short circuits caused by vibration or wire movement during motor operation. Further, due to the fact that the winding end turns can be compressed into a far more dense mass than has been accomplished heretofore, the stator core members of standard construction may now be provided with an increased amount of copper thereby resulting in a higher output performance for any given motor size. Moreover, the stator members constructed in accordance with the present invention can be advantageously utilized in already available housings, e.g. used compressor casings, where space for the stator unit and its winding end turns is at a premium. In addition, due to the simplicity and versatility of my improved method and apparatus, winding end turns may now be formed into a wide variety of configurations by the same method and apparatus at a minimum of manufacturing cost. Thus, by the use of the present invention, there is permitted the mass production manufacture of uniformly high quality stator core members having a minimum of variance between the respective winding end turns at a unit cost considerably lower than has been accomplished heretofore.

While the present invention has been described by reference to a preferred embodiment thereof, it is to be understood that modifications may be made by those skilled in the art without actually departing from the invention. I therefore aim in the appended claims to cover all such equivalent variations as come within the true spirit and scope of the invention.

What I claim as new and desire to secure by Letters Patent of the United States is:

1. A method for forming and shaping stator core winding end turn assemblies having a plurality of wires, which comprises, positioning an end turn assembly to be formed between two assemblies each having walls defining shaping surfaces, compressing said end turn assembly between said shaping surface walls while concurrently producing a rolling engagement between said end turn assembly and at least one of said shaping surface walls whereby the wires tend to flow in front of said rolling engagement to form a compact mass having peripheral surfaces substantially conforming to the contour of said shaping surfaces, and removing said formed end turn assembly from between said shaping surface walls.

2. A method for forming and shaping stator core winding end turn assemblies having a plurality of wires, which comprises, positioning an end turn assembly to be formed between two assemblies having relatively rotatable walls defining shaping surfaces, compressing said end turn assembly between said shaping surface walls with said end turn assembly being moved relative to at least one of said shaping surface walls to produce a rolling pressure engagement whereby the wires tend to flow in front of said rolling pressure engagement to form a compact mass having peripheral surfaces substantially conforming to the contour of said shaping surfaces, and removing said formed end turn assembly from between said shaping surface walls.

3. A method for forming and shaping stator core winding end turn assemblies having a plurality of wires, which comprises, positioning a winding end turn assembly to be formed between two assemblies having relatively rotatable walls defining shaping surfaces, mounting said winding end turn assembly for rotation with one of said shaping surface assemblies, compressing said end turn assembly between said shaping surface walls while rotating said end turn assembly and said one shaping surface assembly relative to the other of said shaping surface assembly to produce a rolling engagement between said end turn assembly and said other shaping surface assembly whereby the wires tend to flow in front of said rolling engagement to form a compact mass having peripheral surfaces substantially conforming to the contour of said shaping surface walls, and removing said formed end turn assembly from between said shaping surface assemblies.

4. A method for forming and shaping stator core winding end turn assemblies having a plurality of wires, which comprises, positioning an end turn assembly to be formed between two assemblies having relatively rotatable walls defining shaping surfaces, mounting said winding end turn assembly for rotation with one of said shaping surface assemblies, moving the other of said shaping surface assemblies into contact with said end turn assembly, compressing said end turn assembly between said shaping surface walls while rotating said end turn assembly and said one shaping surface assembly relative to the said other shaping surface assembly to produce a rolling engagement between said end turn assembly and said other shaping surface assembly whereby the wires tend to flow in front of said rolling engagement to form a compact mass having peripheral surfaces substantially conforming to the contour of said shaping surface walls, moving the other of said shaping surface assemblies out of contact with said end turn assembly, disassembling said end turn assembly from said one shaping surface assembly, and removing said formed end turn assembly from between said shaping surface assemblies.

5. A method for forming and shaping stator core winding end turn assemblies having a plurality of wires, which comprises, positioning an end turn assembly to be formed between inner and outer shaping surface walls, mounting said end turn assembly to rotate with said outer shaping surface wall, compressing said end turn assembly between said shaping surface walls while rotating said end turn assembly and outer shaping surface wall relative to said inner shaping surface wall to produce a rolling pressure engagement between said end turn assembly and said inner shaping surface wall whereby the wires tend to flow in front of said rolling pressure engagement to form a compact mass having peripheral surfaces substantially conforming to the contour of said shaping surface walls, moving said inner shaping surface wall out of contact with said end turn assembly, disassembling said end turn assembly from said outer shaping surface wall, and removing said formed end turn assembly from between said shaping surface walls.

6. A method for forming and shaping stator core winding end turn assemblies having a plurality of wires, which comprises, positioning an end turn assembly to be formed between inner and outer shaping surface walls, mounting said end turn assembly to rotate with said outer shaping surface wall, rotating said end turn assembly and outer shaping surface wall while moving said inner shaping surface wall into contact with said end turn assembly causing the rotation of said inner shaping surface wall, compressing said end turn assembly between said shaping surface walls while rotating said end turn assembly and outer shaping surface wall relative to said inner shaping surface wall to produce a rolling pressure engagement between said end turn assembly and said inner shaping surface wall whereby the wires tend to flow in front of said rolling pressure engagement to form a compact mass having peripheral surfaces substantially conforming to the contour of said shaping surface walls, stopping the rotation of said end turn assembly and said outer shaping surface wall, moving said inner shaping surface wall out of contact with said end turn assembly, disassembling said end turn assembly from said outer shaping surface wall, and removing said formed end turn assembly from between said shaping surface walls.

7. A method of simultaneously forming and shaping a pair of winding end turn assemblies having a plurality of wires, one assembly being disposed adjacent each side face of a stator core member, which comprises, positioning one of said end turn assemblies in a holding and forming unit between two cooperating assemblies each having walls defining shaping surfaces and, locking said one end turn assembly in said unit to rotate with one of said shaping surface assemblies, moving axially a forming unit in contact with said other end turn assembly with said other end turn assembly being positioned between two other cooperating assemblies each having walls defining shaping surfaces and being rotatable with one of said other shaping surface assemblies, simultaneously compressing each end turn assembly between said cooperating shaping surface assemblies to produce a rolling pressure engagement between each end turn assembly and at least one of the associated shaping surface assemblies whereby the wires of each end turn assembly tend to flow in front of said rolling pressure engagement to form a compact mass having peripheral surfaces substantially conforming to the contour of said shaping surface wall, moving said forming unit out of contact with said other end turn assembly, disassembling said one end turn assembly from said holding and forming unit, and removing said one end turn assembly from between said cooperating shaping surface assemblies of said holding and forming unit.

8. A method for simultaneously forming and shaping a pair of winding end turn assemblies having a plurality of wires, one assembly being disposed adjacent each side face of a stator core member, which comprises, positioning the first of said end turn assemblies between outer and inner shaping surface walls of a holding and forming unit, mounting said first end turn assembly in said unit to rotate with said outer shaping surface wall, moving axially a forming unit in contact with said second end turn assembly with said second end turn assembly being positioned between second outer and inner shaping surface walls and being rotatable with said first outer surface wall and said second outer surface wall, simultaneously compressing said first and second end turn assemblies between said first and second shaping surface walls respectively to produce a rolling pressure engagement between said end turn assemblies and the respective inner shaping surface walls causing the wires of each end turn assembly to flow in front of said rolling pressure engagement to form a compact mass having peripheral surfaces substantially conforming to the contour of said shaping surface walls, moving said forming unit out of contact with said second end turn assembly, disassembling said first end turn assembly from said holding and forming unit, and removing said first end turn assembly from between said first outer and inner shaping surface walls of said holding and forming unit.

9. An apparatus for forming and shaping an end turn assembly of a stator core member, comprising a holding and forming unit having a rotatably mounted end turn assembly receiving and forming chamber with at least one wall defining a first end turn shaping surface, means for holding said end turn assembly within said chamber for rotation therewith, an assembly having walls defining a second end turn shaping surface spaced from said first end turn shaping surface wall, means for moving at least one of said shaping surface walls between a retracted position and an extended position located a predetermined radial distance from the other end turn shaping surface wall, said first and second shaping surface walls engaging said end turn assembly when said one shaping surface wall is in its extended position, means for rotatably driving at least one of said shaping surface walls while one of said shaping surface walls is in its extended position, and means for producing a rolling engagement between one of said shaping surface walls and said end turn assembly thereby to form said assembly into a formed compact mass having peripheral surfaces which substantially conform to the contour of said shaping surface walls.

10. An apparatus for forming and shaping an end turn assembly of a stator core member, comprising a holding and forming unit having a rotatably mounted end turn receiving and forming chamber with at least one wall defining an outer end turn shaping surface, means for holding said end turn assembly within said chamber for rotation therewith, an assembly disposed within said chamber and having a rotatable wall defining an inner end turn shaping surface spaced from said outer end turn shaping surface wall, means for moving said inner shaping surface wall between a retracted position and an extended position located a predetermined radial distance from said outer end turn shaping surface wall, said inner and outer shaping surface walls engaging said end turn assembly when said inner shaping surface wall is in its extended position, means for rotatably driving at least one of said shaping surface wall while said inner shaping surface wall is in its extended position whereby a rolling engagement is produced between said inner shaping surface wall and said end turn assembly thereby to form said assembly into a formed compact mass having peripheral surfaces substantially conforming to the contour of said shaping surface walls.

11. An apparatus for forming and shaping an end turn assembly of a stator core member, comprising an assembly with at least one wall defining an outer end turn shaping surface, an assembly having a wall defining an inner end turn shaping surface spaced from said outer end turn shaping surface wall, means for moving at least one of said shaping surface walls between a retracted position and an extended position located a predetermined radial distance from the other end turn shaping surface wall, said inner and outer shaping surface walls engaging said end turn assembly when said one shaping surface wall is in its extended position, means for rotatably driving at least one of said shaping surface walls while one of said shaping surface walls is in its extended position, and means for producing a rolling engagement between one of said shaping surface walls and said end turn assembly thereby forming said end turn assembly into a compact mass having peripheral surfaces substantially conforming to the contour of said shaping surface walls.

12. An apparatus for forming and shaping an end turn assembly of a stator core member, comprising a holding and forming unit having a rotatably mounted end turn receiving and forming chamber with at least one wall defining an outer end turn shaping surface, means for holding said end turn assembly within said chamber for rotation therewith, an assembly disposed within said chamber and having a rotatable wall defining an inner end turn shaping surface spaced from said outer end turn shaping surface wall, means for moving said inner shaping surface wall between a retracted position and an extended position located a predetermined radial distance from said outer end turn shaping surface wall, said inner and outer shaping surface walls engaging said end turn assembly when said inner shaping surface wall is in its extended position, means for rotatably driving said outer shaping surface wall and end turn holding means while said inner shaping surface wall is in its extended position whereby a rolling engagement is produced between said inner shaping surface wall and said end turn assembly thereby to form said assembly into a formed compact mass having peripheral surfaces substantially conforming to the contour of said shaping surface walls.

13. An apparatus for forming and shaping an end turn assembly of a stator core member, comprising a holding and forming unit having an end turn receiving and forming chamber with at least one wall defining an outer end turn shaping surface, said chamber being rotatably mounted and formed with a central opening, means to hold said end turn assembly within said chamber for rotation therewith, a mechanism for forming and shaping the inner end turn surface, said mechanism comprising a shaft having an eccentric end portion extending into said chamber through said central opening, an assembly mounted on said eccentric end portion, said assembly being provided with a rotatable annular wall defining an inner end turn shaping surface spaced from said outer shaping surface, means for imparting movement to said shaft to pivot said inner shaping surface wall between a retracted position and an extended position located a predetermined radial distance from said outer shaping surface wall, said inner and outer shaping surface walls engaging said end turn assembly when said inner shaping surface wall is in its extended position, means for rotatably driving said chamber and end turn holding means while said inner shaping surface wall is in its extended position to produce a rolling pressure engagement between said inner shaping surface wall and said end turn assembly thereby forming said end turn assembly into a formed compact mass having peripheral surfaces substantially conforming to the contour of said cooperating shaping surface walls.

14. Apparatus for forming and shaping a pair of winding end turn assemblies having a plurality of wires, one assembly being disposed adjacent each side face of the stator core member, comprising a holding and forming unit having a rotatably mounted first end turn assembly receiving and forming chamber, a forming unit spaced from and axially movable relative to said holding and forming unit, said forming unit having a second end turn assembly receiving and forming chamber rotatably mounted in axial alignment with said first chamber, means for holding one of said end turn assemblies within said first chamber for rotation therewith, each of said chambers having at least one wall defining an outer end turn shaping surface, a shaping assembly disposed within each of said chambers and having a freely rotatable wall defining an inner end turn shaping surface spaced from said outer end turn shaping surface wall, means for moving each of said inner shaping surface walls between a retracted position and an extended position located a predetermined radial distance from said respective outer end turn shaping surface walls, means for moving said holding and forming unit and said forming unit axially toward or away from each other, means for rotatably driving said first and second chambers and the winding end turn holding means in unison while the inner shaping surface walls of the respective units are in their extended positions, whereby a rolling engagement is produced between each of said inner shaping surface walls and said end turn assemblies to form each of said end turn assemblies into a formed compact mass having peripheral surfaces substantially conforming to the contour of said cooperating shaping surface walls.

References Cited in the file of this patent

UNITED STATES PATENTS

| | | |
|---|---|---|
| 743,513 | Jefferson | Nov. 10, 1903 |
| 1,173,471 | Wilkinson | Feb. 29, 1916 |
| 1,408,890 | Kimble | Mar. 7, 1922 |
| 1,556,893 | Ahlers | Oct. 13, 1925 |
| 1,608,715 | Barr | Nov. 30, 1926 |
| 1,740,792 | Strachauer | Dec. 24, 1929 |
| 1,964,441 | Phelps | June 26, 1934 |
| 2,215,731 | Williams | Sept. 24, 1940 |
| 2,506,173 | Polard | May 2, 1950 |
| 2,721,284 | Elmer | Oct. 18, 1955 |
| 2,829,428 | Polard | Apr. 8, 1958 |

FOREIGN PATENTS

| | | |
|---|---|---|
| 747,968 | Germany | Oct. 23, 1944 |
| 935,765 | France | Feb. 9, 1948 |